US011734449B2

(12) United States Patent
Tanaka et al.

(10) Patent No.: US 11,734,449 B2
(45) Date of Patent: Aug. 22, 2023

(54) DATA USING DEVICE AND DATA USING METHOD

(71) Applicant: Roland Corporation, Shizuoka (JP)

(72) Inventors: Ikuo Tanaka, Shizuoka (JP); Koji Iida, Shizuoka (JP); Naoyuki Ide, Shizuoka (JP)

(73) Assignee: Roland Corporation, Shizuoka (JP)

( * ) Notice: Subject to any disclaimer, the term of this patent is extended or adjusted under 35 U.S.C. 154(b) by 6 days.

(21) Appl. No.: 17/243,593

(22) Filed: Apr. 29, 2021

(65) Prior Publication Data

US 2021/0342474 A1 Nov. 4, 2021

(30) Foreign Application Priority Data

Apr. 30, 2020 (JP) ................. 2020-080096

(51) Int. Cl.
*H04L 29/06* (2006.01)
*G06F 21/62* (2013.01)
(Continued)

(52) U.S. Cl.
CPC .......... *G06F 21/6245* (2013.01); *G06F 21/31* (2013.01); *G06F 21/604* (2013.01);
(Continued)

(58) Field of Classification Search
CPC ............ H04L 63/1425; H04L 63/1433; G06Q 20/4016
See application file for complete search history.

(56) References Cited

U.S. PATENT DOCUMENTS

2005/0005130 A1\* 1/2005 Okigami ............... H04L 63/102
713/183
2005/0097348 A1\* 5/2005 Jakubowski .......... H04L 9/0866
726/29
(Continued)

FOREIGN PATENT DOCUMENTS

JP 2005195901 7/2005
JP 2006254244 9/2006
(Continued)

OTHER PUBLICATIONS

"Search Report of Europe Counterpart Application", dated Sep. 28, 2021, p. 1-p. 7.
(Continued)

*Primary Examiner* — Jason K Gee
(74) *Attorney, Agent, or Firm* — JCIPRNET

(57) ABSTRACT

A data using device includes: a data storage part storing pieces of data used for the predetermined process; a user storage part storing a first user identification information; an authentication data acquisition part; a user acquisition part acquiring a second user identification information from the external apparatus; a user determination part; an authentication storage processing part storing the authentication data such that the authentication data is available for the predetermined process when the user determination part determines that the first and second user identification information match each other or when the first user identification information is not stored; a user deletion part deleting or instructing a user to delete the first user identification information when the first and second user identification information do not match each other; and a data use prohibition part prohibiting use of the authentication data when the first user identification information is deleted.

15 Claims, 6 Drawing Sheets

(51) Int. Cl.
*G06F 21/31* (2013.01)
*G06F 21/60* (2013.01)
*G06F 21/78* (2013.01)

(52) U.S. Cl.
CPC ...... *G06F 21/78* (2013.01); *G06F 2221/2141* (2013.01); *G06F 2221/2143* (2013.01)

(56) References Cited

U.S. PATENT DOCUMENTS

2005/0273399 A1* 12/2005 Soma .................. G06Q 20/401
707/758
2008/0172734 A1 7/2008 Sugimoto et al.
2013/0305392 A1* 11/2013 Bar-El ................ H04L 63/0823
726/29

FOREIGN PATENT DOCUMENTS

| JP | 2006309587 | 11/2006 |
| JP | 2009199212 | 9/2009 |
| JP | 6171793 | 8/2017 |

OTHER PUBLICATIONS

"Office Action of Europe Counterpart Application", dated Jun. 27, 2023, p. 1-p. 5.

* cited by examiner

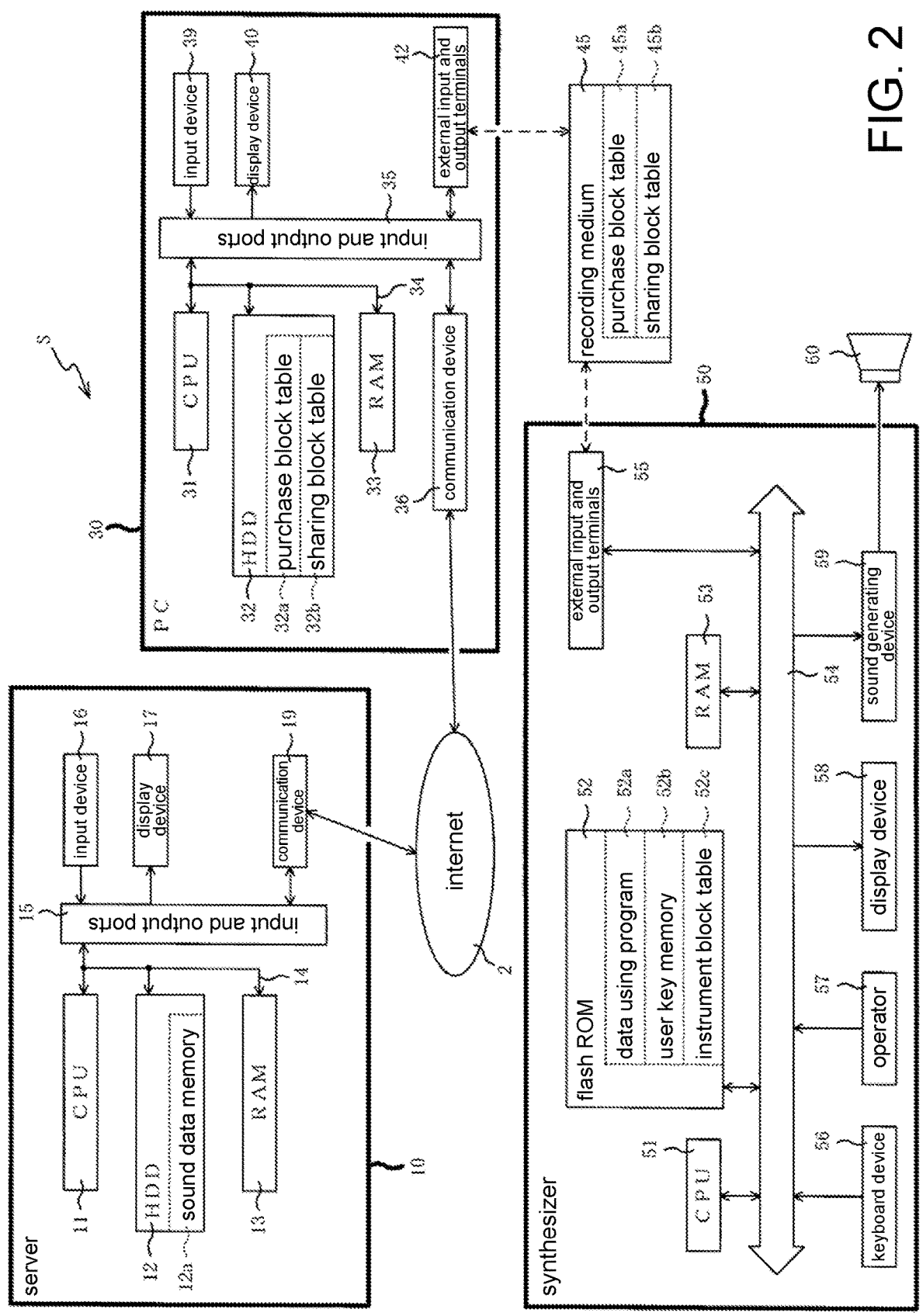

purchase block table 32a, 45a

| No. | sound data | | user key |
|---|---|---|---|
| | tone | wave | |
| 1 | Tone_1 | Wave_1 | A B C |
| 2 | Tone_2 | – | A B C |
| 3 | Tone_3 | – | B C D |
| 4 | – | – | – |
| ⋮ | ⋮ | ⋮ | ⋮ |
| 10 | – | – | – |
| ⋮ | ⋮ | ⋮ | ⋮ |

FIG. 3(a)

sharing block table 32b, 45b

| No. | sound data | | user key |
|---|---|---|---|
| | tone | wave | |
| 1 | Tone_4 | – | C D E |
| 2 | Tone_5 | – | A B C |
| 3 | – | – | – |
| 4 | – | – | – |
| ⋮ | ⋮ | ⋮ | ⋮ |
| 10 | – | – | – |
| ⋮ | ⋮ | ⋮ | ⋮ |

FIG. 3(b)

instrument block table 52c

| No. | sound data | |
|---|---|---|
| | tone | wave |
| 1 | Tone_1 | Wave_1 |
| 2 | Tone_2 | – |
| 3 | Tone_4 | – |
| 4 | Tone_5 | Wave_1 |
| ⋮ | ⋮ | ⋮ |
| 10 | – | – |
| ⋮ | ⋮ | ⋮ |

FIG. 3(c)

DATA USING DEVICE AND DATA USING METHOD

CROSS-REFERENCE TO RELATED APPLICATION

This application claims the priority benefit of Japan application serial no. 2020-080096, filed on Apr. 30, 2020. The entirety of the above-mentioned patent application is hereby incorporated by reference herein and made a part of this specification.

BACKGROUND

Technical Field

The disclosure relates to a data using device and a data using method capable of curbing use of data acquired by another user.

Description of Related Art

For example, there is a system in which, when sound data purchased by a user is downloaded to an electronic musical instrument from a server that distributes the sound data, the sound data is prevented from being used by users other than the user that has purchased the sound data. In Patent Document 1, sound data purchased by a user is encrypted with a user ID to be sent to an electronic musical instrument from the server, the sound data is decrypted with a user ID registered in the electronic musical instrument, and the sound data in an available state is stored in the electronic musical instrument.

PATENT DOCUMENTS

[Patent Document 1] Japanese Patent No. 6171793

However, in the technique disclosed in Patent Document 1, in a case where the user IDs match each other when the purchased sound data is stored in the electronic musical instrument, the sound data can be used in the electronic musical instrument. Thus, there is a problem in that, if a user ID to be registered in an electronic musical instrument is changed after sound data is stored in the electronic musical instrument, sound data purchased by a user before the change can be used in the electronic musical instrument.

SUMMARY

According to an embodiment, there is provided a data using device that executes a predetermined process by using data. The data using device includes: a data storage part that stores pieces of data used for the predetermined process; a user storage part that stores a first user identification information; an authentication data acquisition part that acquires, from an external apparatus, authentication data that is data requiring authentication using the first user identification information when using the authentication data for the predetermined process; a user acquisition part that acquires a second user identification information indicating a user who can use the authentication data acquired by the authentication data acquisition part from the external apparatus; a user determination part that determines whether the second user identification information acquired by the user acquisition part matches the first user identification information stored in the user storage part; an authentication storage processing part that stores the authentication data acquired by the authentication data acquisition part into the data storage part such that the authentication data is available for the predetermined process in a case where the user determination part determines that the first and second user identification information match each other or in a case where the first user identification information is not stored in the user storage part; a user deletion part that deletes the first user identification information stored in the user storage part or instructs a user to delete the first user identification information in a case where the user determination part determines that the first and second user identification information do not match each other; and a data use prohibition part that prohibits use of the authentication data stored in the data storage part in a case where the first user identification information stored in the user storage part is deleted.

According to an embodiment, there is provided a data using device that executes a predetermined process by using data. The data using device includes: a data memory that stores pieces of data used for the predetermined process; a user memory that stores a first user identification information; a user determination part that determines whether a second user identification information acquired from an outside matches the first user identification information stored in the user memory, the first and second user identification information indicating a user who can use authentication data, and the authentication data being data that requires authentication using the first and second user identification information when using the authentication data for the predetermined process; and an authentication storage processing part that stores the authentication data acquired from the outside into the data memory such that the authentication data is available for the predetermined process in a case where the user determination part determines that the first and second user identification information match each other or in a case where the first user identification information is not stored in the user memory.

According an embodiment, there is provided a data using method of executing a predetermined process by using data. The data using method includes: making authentication data acquired from an outside available for the predetermined process in a case where a first user identification information is not stored or the stored first user identification information matches a second user identification information acquired from the outside, the first and second user identification information indicating a user who can use the authentication data, and the authentication data being data that requires authentication using the first and second user identification information when using the authentication data for the predetermined process; deleting the stored first user identification information or instructing a user to delete the first user identification information in cases other than the case; and prohibiting use of the available authentication data in a case where the stored first user identification information is deleted.

BRIEF DESCRIPTION OF THE DRAWINGS

FIG. 2 is a block diagram illustrating an electrical configuration of the synthesizer, a server, and a PC.

FIG. 3(a) is a diagram schematically illustrating details of a purchase block table, FIG. 3(b) is a diagram schematically illustrating details of a sharing block table, and FIG. 3(c) is a diagram schematically illustrating details of an instrument block table.

DESCRIPTION OF THE EMBODIMENTS

The disclosure provides a data using device and a data using method capable of curbing use of data acquired by another user.

Figure 1:
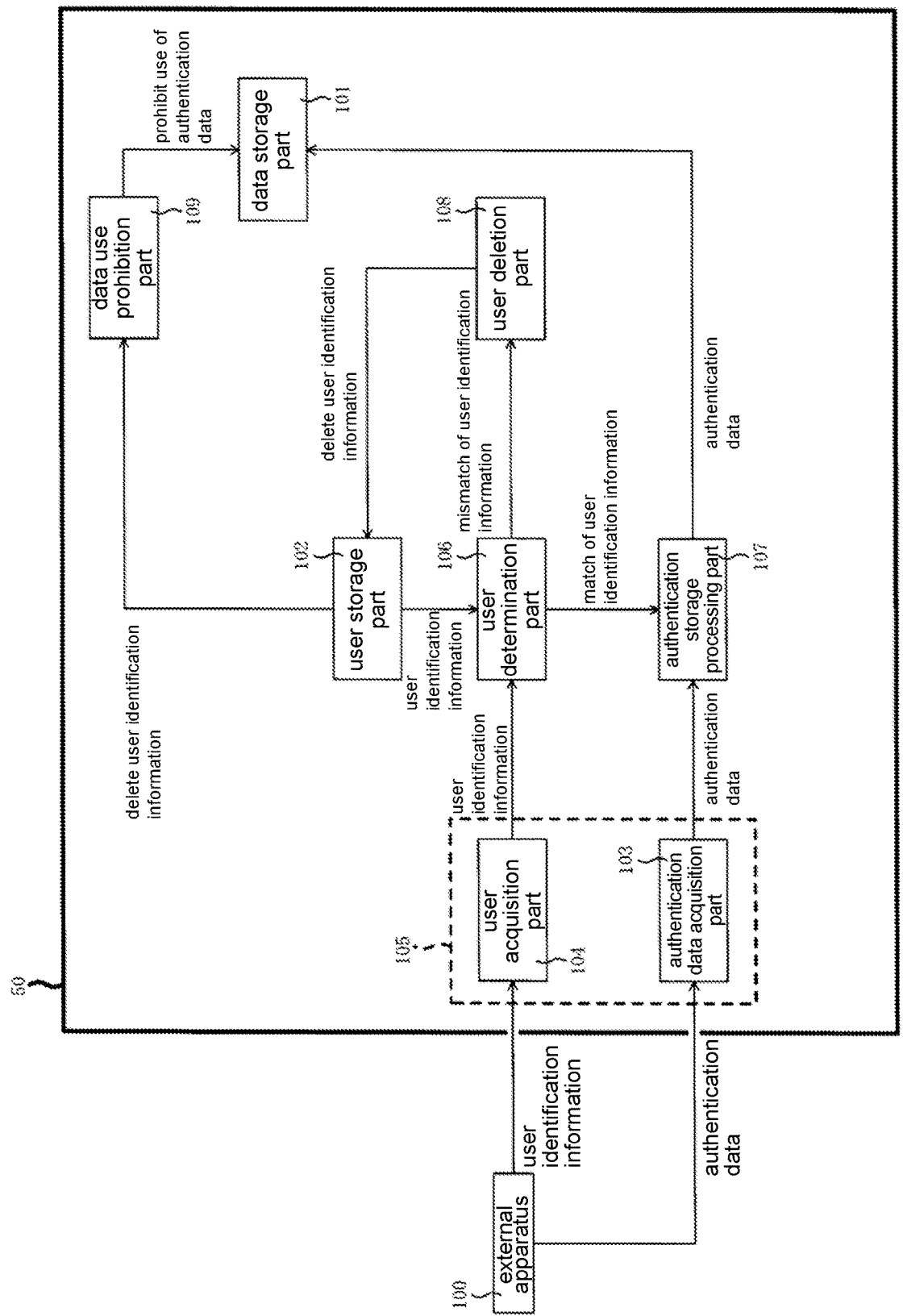
FIG. 1 is a functional block diagram of a synthesizer as a data using device in an embodiment.

Hereinafter, a preferred embodiment will be described with reference to the accompanying drawings. First, with reference to FIG. 1, functions of a synthesizer 50 as a data using device in an embodiment will be described. FIG. 1 is a functional block diagram of the synthesizer 50. As illustrated in FIG. 1, 51 the synthesizer 50 executes a predetermined process (for example, musical sound generation process) by using data (for example, sound data), and includes a data storage part 101, a user storage part 102, an authentication data acquisition part 103, a user acquisition part 104, a user determination part 106, an authentication storage processing part 107, a user deletion part 108, and a data use prohibition part 109.

The data storage part 101 is a function of storing data used for a predetermined process and is realized by an instrument block table 52c that will be described later in FIG. 3(c). The user storage part 102 is a function of storing user identification information and is realized by a user key memory 52b that will be described later in FIG. 2. The authentication data acquisition part 103 is a function of acquiring authentication data that is data requiring authentication using the user identification information in order to be used for a predetermined process from an external apparatus 100 and is realized by a CPU 51 that will be described later in FIG. 2. The user acquisition part 104 is a function of acquiring user identification information indicating a user who can use the authentication data acquired by the authentication data acquisition part 103 from the external apparatus 100 and is realized by the CPU 51. The authentication data acquisition part 103 and the user acquisition part 104 may function as an acquisition part 105 that acquires both the authentication data and the user identification information from the external apparatus 100.

The user determination part 106 is a function of determining whether or not the user identification information acquired by the user acquisition part 104 matches the user identification information stored in the user storage part 102 and is realized by the CPU 51. The authentication storage processing part 107 is a function of storing the authentication data acquired by the authentication data acquisition part 103 into the data storage part 101 such that the authentication data can be used for a predetermined process in a case where the user determination part 106 determines that the pieces of user identification information match each other, and is realized by the CPU 51. In a case where user identification information is not stored in the user storage part 102, the authentication storage processing part 107 may be a function of storing the authentication data acquired by the authentication data acquisition part 103 into the data storage part 101.

The user deletion part 108 is a function of deleting the user identification information stored in the user storage part 102 in a case where the user determination part 106 determines that the pieces of user identification information do not match each other, and is realized by the CPU 51. In a case where the user determination part 106 determines that the pieces of user identification information do not match each other, the user deletion part 108 may be a function of instructing a user to delete the user identification information stored in the user storage part 102 by using a display device 58 or the like that will be described later in FIG. 2. The data use prohibition part 109 is a function of prohibiting the use of the authentication data stored in the data storage part 101 in a case where the user identification information stored in the user storage part 102 is deleted, and is realized by the CPU 51. In order to prohibit the use of the authentication data, the authentication data may be deleted, and the authentication data may be associated with an identifier or the like indicating "unavailable".

In the synthesizer 50, when authentication data acquired from the external apparatus 100 is stored into the data storage part 101, in a case where user identification information associated with the authentication data matches user identification information stored in the user storage part 102, the authentication data can be stored into the data storage part 101. On the other hand, in a case where the pieces of user identification information do not match each other, the user identification information stored in the user storage part 102 is deleted, and the use of authentication data already stored in the data storage part 101 is prohibited. Consequently, in a case where authentication data is stored in the data storage part 101, and then user identification information stored in the user storage part 102 is deleted due to a change of a user, authentication data acquired by a user before the deletion cannot be used in the synthesizer 50.

Next, with reference to FIG. 2, an outline of a data using system S in which a server 10 and a personal computer (PC) 30 are added to the synthesizer 50 will be described. FIG. 2 is a block diagram illustrating an electrical configuration of the server 10, the PC 30, and the synthesizer 50. The data using system S is configured to include the server 10, the PC 30 connected to the server 10 via the Internet 2, and the synthesizer 50 that performs data communication with the PC 30 via a recording medium 45 (external apparatus).

The synthesizer 50 is an electronic musical instrument that mixes and outputs (releases) musical sounds generated by a user's performance operation on a keyboard device 56, predetermined accompaniment sounds, and the like. When a plurality of operators 57 is operated, the synthesizer 50 performs a predetermined calculation process on waveform data in which musical sounds or accompaniment sounds due to a performance of a performer are mixed, and thus applies effects such as reverb, chorus, and delay to those sounds.

The server 10 is a computer that stores a plurality of pieces of sound data that can be used in the synthesizer 50, and distributes the sound data to the PC 30 or the like. The PC 30 is a computer that acquires sound data from the server 10 or sound data created by another user via the Internet 2 and stores and manages the acquired sound data. The sound data is sent to the synthesizer 50 from the PC 30 via the recording medium 45.

The server 10 has a CPU 11, an HDD 12, and a RAM 13, and these constituents are connected to input and output ports 15 via a bus line 14. The input and output ports 15 are connected to an input device 16 to which an instruction from a manager of the server 10 is input, a display device 17 that displays information at the time of the input, and a communication device 19.

The CPU 11 is a calculation device that controls the respective constituents that are connected to each other via the bus line 14. The HDD 12 is a rewritable nonvolatile storage device that stores various programs executed by the CPU 11 or fixed value data. The HDD 12 is provided with a sound data memory 12a.

The sound data memory 12a is a memory storing a plurality of pieces of sound data that can be used in the synthesizer 50. The sound data is sound source data of musical sound generated by the synthesizer 50. When the sound data stored in the sound data memory 12a of the server 10 is purchased by a user of the synthesizer 50, and the server 10 receives a request for outputting the purchased sound data to the PC 30, the server 10 outputs a purchase block (authentication block) including the sound data to the PC 30 or the like. The purchase block includes not only the sound data but also a user key (user identification information) of the user who has purchased the sound data (who can use the sound data).

The purchase block requires authentication using a user key in order to use the sound data in the synthesizer 50. In other words, the sound data of the purchase block is authentication data that can be used through authentication using the user key. The user key is identification information for identifying a user registered in a service for purchasing sound data from the server 10.

A request signal for sending the purchase block to the PC 30 is not necessarily required to be sent to the server 10 from the PC 30. In a case where requested sound data, a user key of a registered user, and a transmission destination are included in the request signal, the request signal may be sent to the server 10 from a PC different from the PC 30 or a mobile phone via the Internet 2.

The RAM 13 is a memory that stores various types of work data, flags, and the like in a rewritable manner when the CPU 11 executes a program such as a control program. The communication device 19 is a device that is connected to the PC 30 via the Internet 2 and transmits and receives various types of data to and from the PC 30.

The PC 30 has the CPU 31, an HDD 32, and a RAM 33, and these constituents are connected to the input and output ports 35 via a bus line 34. The input and output ports 35 are connected to a communication device 36, an input device 39 such as a mouse or a keyboard used for a user to input an instruction, a display device 40 that displays information at the time of the input, and external input and output terminals 42.

The CPU 31 is a calculation device that controls the respective constituents that are connected to each other via the bus line 34. The HDD 32 is a rewritable nonvolatile storage device. The HDD 32 is provided with a purchase block table 32a and a sharing block table 32b.

With reference to FIG. 3(a), the purchase block table 32a will be described. FIG. 3(a) is a diagram schematically illustrating details of the purchase block table 32a. The purchase block table 32a is a data table that stores a purchase block including sound data, received from the server 10 via the Internet 2. Specifically, the purchase block table 32a stores sound data included in a purchase block received from the server 10 and a user key in correlation with each other. The sound data necessarily includes tone data regarding tone information, and may include wave data regarding sound waveform information.

The tone data is formed of variable values that are adjustable by using the operators 57 on the synthesizer 50. In other words, the tone data can be created or edited on the synthesizer 50. On the other hand, the wave data cannot be edited or created by using the operators 57 on the synthesizer 50. The wave data is data obtained by performing digital conversion on waveform information regarding sounds of an acoustic musical instrument and the like, collected by microphones or the like.

With reference to FIG. 3(b), the sharing block table 32b will be described. FIG. 3(b) is a diagram schematically illustrating details of the sharing block table 32b. The sharing block table 32b is a data table that stores a sharing block including sound data output from the synthesizer 50 of a user or a sharing block including sound data output from the synthesizer 50 (external device) of another user. The sharing block does not require authentication using a user key in order to use sound data in the synthesizer 50. In other words, the sound data of the sharing block is shared data that does not require authentication of user identification information for use thereof. Thus, the sound data of the sharing block can be shared by users.

The sound data of the sharing block necessarily includes the tone data formed of variable values that can be created or edited on the synthesizer 50, and does not include the wave data that cannot be edited or created on the synthesizer 50. As described above, since the tone data that can be created or edited on the synthesizer 50 can be shared by users, for example, each user in a group can perform by using the same tone in the group without creating tone data.

As purchasable sound data (of a purchase block), there is sound data formed of only tone data in the same manner as the sound data of the sharing block. If the purchased sound data formed of only the tone data is output as a sharing block to be shared by users, the number of users purchasing the sound data formed of only the tone data is reduced. Therefore, the sharing block includes a user key of a user outputting the purchase block (sound data). Consequently, in a case where the sharing block including the purchased sound data formed of only the tone data is uploaded onto the Internet 2, a user who has output the uploaded sharing block can be tracked, and thus it is possible to curb users from uploading such sound data of which sharing is not preferable.

The purchase block and the sharing block can be differentiated from each other by setting different extensions for the respective blocks. The purchase block and the sharing block may be differentiated from each other by causing different pieces of type information to be included in the respective blocks.

FIG. 2 is referred to again. The RAM 33 is a memory that stores various types of work data, flags, and the like in a rewritable manner when the CPU 31 executes a control program or the like. The communication device 36 is a device that is connected to the server 10 via the Internet 2 and transmits and receives various types of data to and from the server 10. The external input and output terminals 42 are an interface used to transmit and receive various types of data to and from the portable recording medium 45.

The recording medium 45 is a rewritable nonvolatile storage device, and is configured to be detachably attached to the external input and output terminals 42. The recording medium 45 is provided with a purchase block table 45a and a sharing block table 45b. A configuration of the purchase block table 45a is the same as the configuration of the purchase block table 32a of the PC 30. The purchase block table 45a stores a purchase block selected to be copied among purchase blocks stored in the purchase block table 32a. In the present embodiment, a description will be made assuming that all purchase blocks stored in the purchase block table 32a are stored in the purchase block table 45a.

A configuration of the sharing block table 45b is the same as the configuration of the sharing block table 32b of the PC 30. The sharing block table 45b stores a sharing block selected to be copied among sharing blocks stored in the sharing block table 32b. Similarly, the sharing block table 32b stores a sharing block selected to be copied among sharing blocks stored in the sharing block table 45b.

The synthesizer 50 has a CPU 51, a flash ROM 52, and a RAM 53, and these constituents are connected to a bus line 54. The bus line 54 is connected to external input and output terminals 55, the keyboard device 56, the operators 57, the display device 58 that displays an error message or the like, and a sound generating device 59. The sound generating device 59 is connected to a speaker 60.

The external input and output terminals 55 are an interface used to transmit and receive various types of data to and from the portable recording medium 45. The recording medium 45 is configured to be detachably attached to the external input and output terminals 55.

The keyboard device 56 is an input device to which performance information is input by a user (performer). The operators 57 are an input device to which, for example, an instruction for adjusting variable values for creating or editing sound data is input from the user.

The sound generating device 59 is a device that controls tones of musical sounds, various effects, or the like according to a sounding signal from the CPU 51. The sounding signal is output to the sound generating device 59 from the CPU 31 on the basis of an input from the keyboard device 56. Although not illustrated, the sound generating device 59 includes a digital signal processor (DSP) that performs a calculation process such as applying a filter or an effect to waveform data, a digital to analog converter (DAC) that converts a digital musical sound signal subjected to the process in the DSP into an analog signal, and an amplifier that amplifies the signal from the DAC. The speaker 60 generates a musical sound based on a musical sound signal output from the sound generating device 59.

The CPU 51 is a calculation device that controls the respective constituents that are connected to each other via the bus line 54. The flash ROM 52 is a rewritable nonvolatile memory. The flash ROM 52 is provided with a data using program 52a, the user key memory 52b, and the instrument block table 52c.

When the data using program 52a is executed by the CPU 51, main processes (refer to FIG. 4) are executed right after the data using program 52a is executed, and a data storage process (refer to FIG. 5) and a data output process (refer to FIG. 6) among the main processes are executed. Processes (S6) other than the main processes include a process of creating or editing sound data in response to an input from the operators 57.

The user key memory 52b is a memory that stores only one user key of a user who owns (uses) the synthesizer 50. An invalid value is stored in the user key memory 52b when the synthesizer 50 is shipped from a factory.

With reference to FIG. 3(c), the instrument block table 52c will be described. FIG. 3(c) is a diagram schematically illustrating details of the instrument block table 52c. The instrument block table 52c is a data table that stores sound data copied from the purchase block table 45a or the sharing block table 45b of the recording medium 45 or sound data created or edited in the synthesizer 50. Examples of the sound data created or edited in the synthesizer 50 include sound data that is created on the synthesizer 50 from the beginning, sound data obtained by editing sound data copied from the purchase block table 45a or the like, and sound data obtained by editing preset sound data stored in a predetermined region (not illustrated) of the flash ROM 52 when the synthesizer 50 is shipped from a factory.

When sound data of the purchase block stored in the purchase block table 45a is copied to the instrument block table 52c, a user key in the purchase block is required to match a user key of the user key memory 52b. For example, in a case where the user key of the user key memory 52b is "ABC", among the purchase blocks stored in the purchase block table 45a illustrated in FIG. 3(a), sound data (Tone_1 and Wave_1) of No. 1 and sound data (Tone_2) of No. 2 corresponding to the user key "ABC" can be copied to the purchase block table 45a. On the other hand, among the purchase blocks stored in the purchase block table 45a, sound data (Tone_3) of No. 3 corresponding to the user key "BCD" cannot be copied to the purchase block table 45a.

When sound data of the sharing block stored in the sharing block table 45b is copied to the instrument block table 52c, a user key of the sharing block does not need to match a user key of the user key memory 52b. For example, even in a case where the user key of the user key memory 52b is "ABC", among the sharing blocks stored in the sharing block table 45b illustrated in FIG. 3(b), sound data (Tone_4) of No. 1 corresponding to the user key "CDE" can be copied to the purchase block table 45a.

Sound data of No. 4 in the instrument block table 52c illustrated in FIG. 3(c) is obtained by editing the sound data (Tone_1 and Wave_1) of No. 1 copied to the instrument block table 52c from the purchase block table 45a by using the operators 57. In the synthesizer 50, the tone data can be edited by using the operators 57 but the wave data cannot be edited. Thus, in the instrument block table 52c, in the sound data of No. 4 and the sound data of No. 1, the wave data is not changed, and the tone data is changed from Tone_1 to Tone_5.

When the sound data stored in the instrument block table 52c is copied to the sharing block table 45b, a sharing block including tone data included in the sound data and a user key stored in the user key memory 52b is created. The sharing block is stored into the sharing block table 45b. For example, in a case where the user key stored in the user key memory 52b is "ABC", when the sound data (Tone_5 and Wave_1) of No. 4 in the instrument block table 52c illustrated in FIG. 3(c) is copied to No. 2 in the sharing block table 45b illustrated in FIG. 3(b), sound data that includes the tone data of Tone 5 and does not include the wave data and the user key "ABC" are stored in the sharing block table 45b in association with each other.

The RAM 53 is a memory that stores various types of work data, flags, and the like in a rewritable manner when the CPU 51 executes a program such as the data using program 52a.

Figure 4:
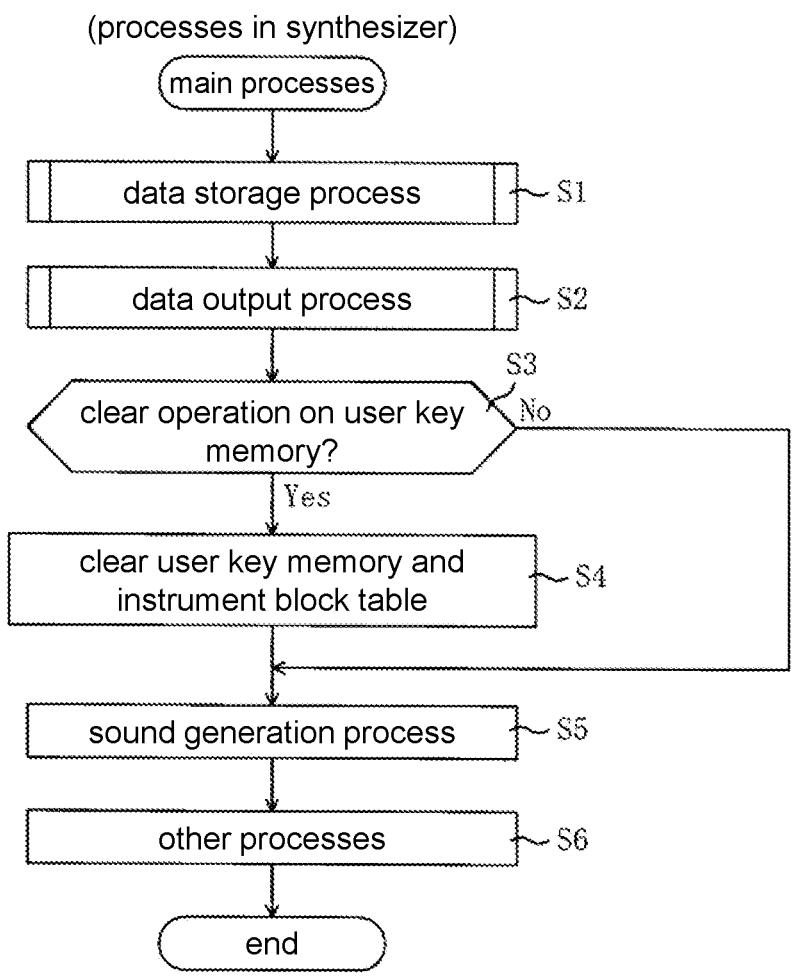
FIG. 4 is a flowchart illustrating main processes executed by a CPU of the synthesizer.
Figure 5:
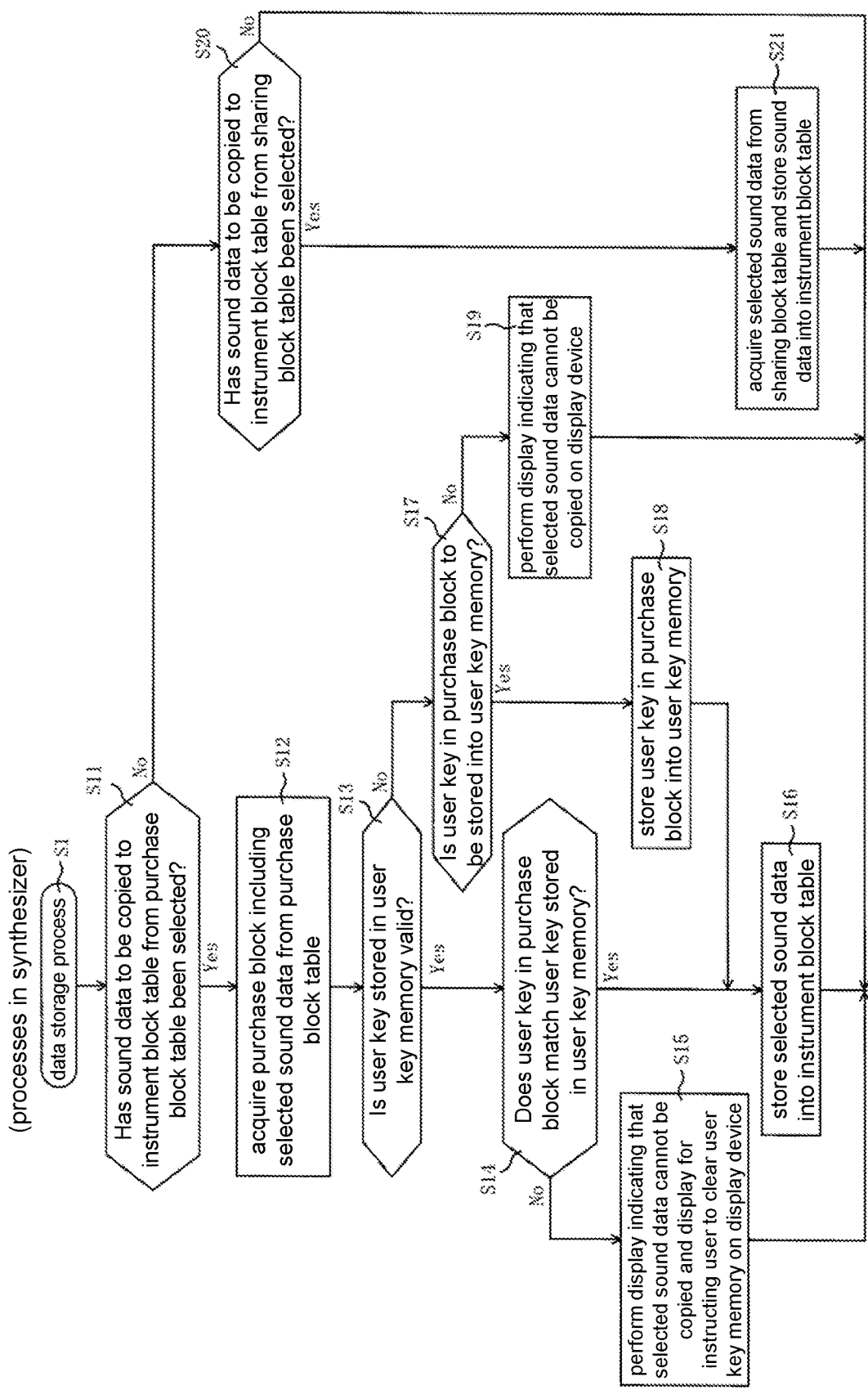
FIG. 5 is a flowchart illustrating a data storage process.
Figure 6:
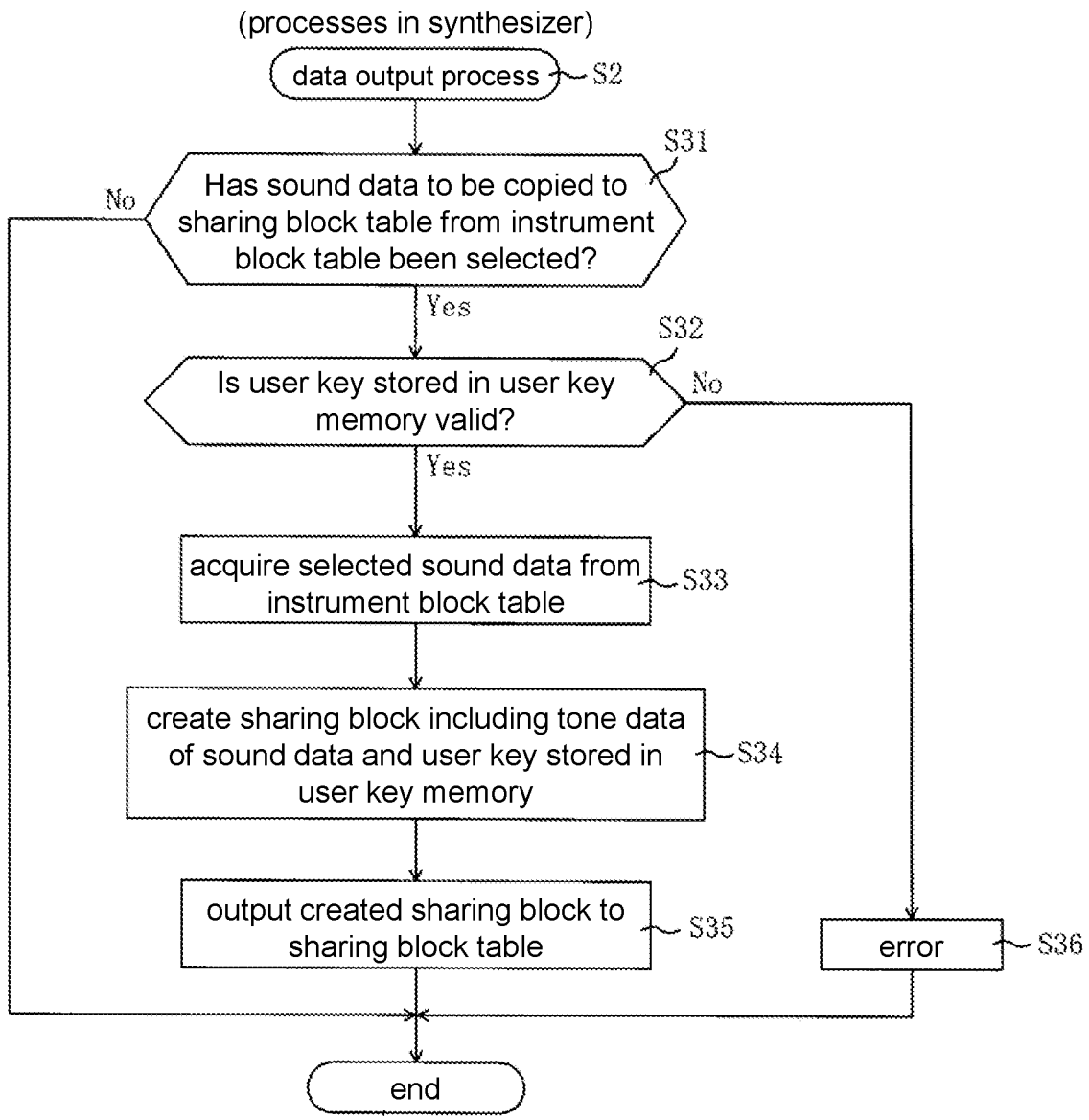
FIG. 6 is a flowchart illustrating a data output process.

With reference to FIGS. 4 to 6, main processes executed by the CPU 51 of the synthesizer 50 will be described. When the data using program 52a is executed by the CPU 51, the main processes are executed. The main processes are started when power is supplied to the synthesizer 50, and are repeatedly executed by the CPU 51 during the supply of the power. In the main processes, clearing of the user key memory 52b or the instrument block table 52c, a data storage process (FIG. 5), and a data output process (FIG. 6) are executed.

FIG. 4 is a flowchart illustrating the main processes. In the main processes, first, the data storage process is performed (S1). Details of the data storage process (S1) will be described later with reference to FIG. 5. After the process in S1, the data output process is performed (S2). Details of the data output process (S2) will be described later with reference to FIG. 6.

After the process in S2, it is checked whether a clear operation has been performed on the user key memory 52b through a user's input by operating the operators 57 (S3). In a case where the clear operation has been performed on the user key memory 52*b* (S3: Yes), the user key memory 52*b* is cleared, and the instrument block table 52*c* is also cleared (S4).

After the process in S4, a sound generation process is performed (S5). In the process in S3, in a case where the clear operation has not been performed on the user key memory 52*b* (S3: No), the process in S4 is skipped, and the sound generation process is performed (S5). The sound generation process includes a process of generating a musical sound based on sound data selected from the instrument block table 52*c* by the user by using the operators 57 or a musical sound based on preset sound data stored in a predetermined region (not illustrated) of the flash ROM 52 when the synthesizer 50 is shipped from a factory in accordance with performance information that is input from the keyboard device 56. The sound generation process further includes a process of outputting a signal indicating the generated musical sound to the sound generating device 59 and releasing the musical sound based on the musical sound signal from the speaker 60.

After the process in S5, other processes are performed (S6), and the main processes are finished. The other processes (S6) include, for example, processes of creating and editing sound data according to an input from the operators 57. In the other processes (S6), when an invalid value is included in the user key memory 52*b*, a user key that is input by the user by using the operators 57 may be stored into the user key memory 52*b*.

Next, with reference to FIG. 5, the data storage process (S1) executed in the main processes in FIG. 4 will be described. In the data storage process (S1), it is determined whether sound data selected from the purchase block table 45*a* or the sharing block table 45*b* of the recording medium 45 can be stored in the instrument block table 52*c* in a state in which the sound data can be used for a musical sound generation process.

FIG. 5 is a flowchart illustrating the data storage process (S1). In the data storage process (S1), first, it is checked whether sound data to be copied to the instrument block table 52*c* from the purchase block table 45*a* of the recording medium 45 has been selected by the user by using the operators 57 (S11). In a case where the sound data has been selected from the purchase block table 45*a* (S11: Yes), a purchase block including the selected sound data is acquired from the purchase block table 45*a* (S12).

Next, it is checked whether a user key stored in the user key memory 52*b* is valid (S13). In a case where the user key stored in the user key memory 52*b* is valid (S13: Yes), the user key of the user who owns the synthesizer 50 has already been registered, and thus it is checked whether a user key in the purchase block acquired through the process in S12 matches the user key stored in the user key memory 52*b* (S14).

In a case where the user keys match each other (S14: Yes), since the sound data selected in S11 can be used for the musical sound generation process in the synthesizer 50, the selected sound data is stored into the instrument block table 52*c* (S16), and the data storage process (S1) is finished.

In the process in S14, in a case where the user key in the purchase block acquired through the process in S12 does not match the user key stored in the user key memory 52*b* (S14: No), display indicating that the sound data selected in S11 cannot be copied and display for instructing the user to clear the user key memory 52*b* (delete the user key) are performed on the display device 58 (S15). The sound data selected in S11 is not stored into the instrument block table 52*c*, that is, the selected sound data is prohibited from being stored into the instrument block table 52*c*, and the data storage process (S1) is finished. Consequently, it is possible to curb users other than a user who has purchased sound data from storing the sound data into the synthesizer 50 and using the sound data.

In the process in S13, in a case where the user key memory 52*b* is cleared in the process in S4 of the main processes in FIG. 4 after an instruction for clearing the user key memory 52*b* is received in the process in S15 or a new user key is not stored from the factory shipment state, an invalid value is included in the user key memory 52*b* (S13: No). In this case, it is checked whether the user key in the purchase block acquired in the process in S12 is to be stored into the user key memory 52*b* (S17).

In a case where there is an operation for storing the user key into the user key memory 52*b* (S17: Yes), the user key in the purchase block is stored into the user key memory 52*b* (S18). The process in S17 may be skipped, and a process in S18 in which the user key in the purchase block is stored into the user key memory 52*b* may be performed in a case where an invalid value is included in the user key memory 52*b* (S13: No). In either case, since the user key in the purchase block acquired in the process in S12 necessarily matches the user key stored in the user key memory 52*b* after the process in S18, the process in S16 in which the sound data selected in S11 is stored into the instrument block table 52*c* is performed without collating the user keys with each other in the process in S14, and the data storage process (S1) is finished.

On the other hand, in the process in S17, in a case where there is an operation of not storing the user key in the purchase block acquired in the process in S12 into the user key memory 52*b* or an operation of storing the user key is not performed for several seconds (S17: No), display indicating that the sound data selected in S11 cannot be copied is performed on the display device 58 (S19). The sound data selected in S11 is not stored into the instrument block table 52*c*, and the data storage process (S1) is finished. Consequently, it is possible to prevent sound data from being copied to the instrument block table 52*c* from the purchase block table 45*a* and being used in a state in which a valid user key is not stored in the user key memory 52*b*.

In the process in S11, in a case where sound data to be copied to the instrument block table 52*c* from the purchase block table 45*a* of the recording medium 45 has been selected (S11: No), it is checked whether sound data to be copied to the instrument block table 52*c* from the sharing block table 45*b* of the recording medium 45 has been selected by the user by using the operators 57 (S20). In a case where sound data copied from the sharing block table 45*b* has not been selected (S20: No), the data storage process (S1) is finished.

On the other hand, in a case where sound data copied from the sharing block table 45*b* has been selected (S20: Yes), copying of the sound data of the sharing block stored in the sharing block table 45*b* does not require collation of user keys. Therefore, the selected sound data is acquired from the sharing block table 45*b* and is stored into the instrument block table 52*c* (S21), and the data storage process (S1) is finished.

Next, with reference to FIG. 6, the data output process (S2) executed in the main processes in FIG. 4 will be described. The data output process (S2) is a process of outputting sound data selected from the instrument block table 52*c* to the sharing block table 45*b* of the recording medium 45 (external apparatus).

FIG. 6 is a flowchart illustrating the data output process (S2). In the data output process (S2), first, it is checked whether sound data to be copied to the sharing block table 45*b* of the recording medium 45 from the instrument block table 52*c* has been selected (S31). In a case where sound data to be copied from the instrument block table 52*c* has not been selected (S31: No), sound data is not output, and thus the data output process (S2) is finished.

On the other hand, in a case where sound data to be copied from the instrument block table 52*c* has been selected (S31: Yes), a user key stored in the user key memory 52*b* is required to be output in association with the selected sound data, and thus it is checked whether the user key stored in the user key memory 52*b* is valid (S32). As described above, the user key being valid indicates that a user key of a user who owns the synthesizer 50 has already been registered in the user key memory 52*b*.

In a case where the user key stored in the user key memory 52*b* is valid (S32: Yes), the sound data selected in the process in S31 is acquired from the instrument block table 52*c* (S33). Next, a sharing block including tone data of the acquired sound data and the user key stored in the user key memory 52*b* is created (S34). Since wave data included in the sound data cannot be created or edited on the synthesizer 50 and can be fundamentally acquired by the user through purchase, the wave data is not included in a sharing block that can be shared by users.

After the process in S34, the sharing block created through the process is output (stored) to the sharing block table 45*b* of the recording medium 45 (S35), and the data output process (S2) is finished. The recording medium 45 storing the sharing block that is output through the data output process (S2) is connected to the synthesizer 50 owned by another user, and thus the tone data of the sound data in the sharing block can also be stored into the instrument block table 52*c* of the synthesizer 50 of the other user through the processes in S20 and S21 in FIG. 5. The sharing block that is output through the data output process (S2) is copied to the PC 30 from the recording medium 45, and the sharing block is uploaded to the Internet 2. Thus, the tone data in the sharing block can be downloaded and used by other users. As a result, it is possible to perform by using the same tone data in a group, that is, to perform by using the same tone in the group.

In the process in S32, in a case where the user key memory 52*b* is cleared in the process in S4 of the main processes in FIG. 4 or a new user key is not stored from the factory shipment state, an invalid value is included in the user key memory 52*b* (S32: No). In this case, since the user key cannot be included in the sharing block, the sound data selected in the process in S31 is prohibited from being copied (S36), and the data output process (S2) is finished. In the process in S36, an error message indicating that the selected sound data cannot be copied or an error message for instructing the user to register a user key in the synthesizer may be displayed on the display device 58.

In the synthesizer 50 in which the above data using program 52*a* is executed, when a purchase block including sound data purchased by a user and a user key of the user is stored into the instrument block table 52*c* of the synthesizer 50 from the recording medium 45 (external apparatus), the sound data can be stored into the instrument block table 52*c* in a case where the user key in the purchase block matches a user key in the user key memory 52*b* of the synthesizer 50 (S11: Yes, S14: Yes, and S16). On the other hand, in a case where the user keys do not match each other, an instruction for deleting the user key in the user key memory 52*b* is given (S11: Yes, S14: No, and S15).

For example, in a case where the user key is actually deleted after the instruction for deletion is given, sound data already stored in the instrument block table 52*c* is deleted such that the sound data is prohibited from being used (S4). As a result, in a case where sound data is stored into the instrument block table 52*c* and then a user key stored in the user key memory 52*b* is changed, sound data acquired (purchased) by a user before the change cannot be used in the synthesizer 50.

When the sound data already stored in the instrument block table 52*c* is deleted in the process in S4, not only wave data, which cannot be shared by users, of the sound data but also tone data that can be shared by users and can be edited on the synthesizer 50 is deleted. There is a case where a user indicated by a user key previously stored in the user key memory 52*b* does not suppose that tone data created or edited by the user or tone data acquired from the Internet is used by a new user. Along with deletion of a user key, not only wave data but also tone data is deleted, and thus it is possible to curb tone data of an old user from being used by a new user.

In a case where a user key of an old user is not stored in the user key memory 52*b* (an invalid value is stored), sound data selected from the purchase block table 45*a* of the recording medium 45 can be stored into the instrument block table 52*c* (S13: No and S16). Also in this case, sound data acquired by the old user has already been deleted from the instrument block table 52*c*, and thus the sound data acquired by the old user cannot be used by the new user.

However, in a case where sound data selected from the purchase block table 45*a* is stored into the instrument block table 52*c* in a state in which a user key is not stored in the user key memory 52*b*, a user key in a purchase block including the selected sound data is stored into the user key memory 52*b* (S13: No, S17: Yes, S18, and S16). Consequently, it is possible to prevent a case where sound data (sound data of a purchase block including another user key) purchased by another user is stored into the synthesizer 50 in which a user key is not stored in the user key memory 52*b* and the sound data purchased by the other user is used in the single synthesizer 50.

Only one user key is stored in the user key memory 52*b*. Consequently, in order for a new user different from a user corresponding to a user key already stored in the user key memory 52*b* to copy data purchased by the new user to the instrument block table 52*c* from the recording medium 45, the new user is necessarily required to delete the user key already stored in the user key memory 52*b* and sound data already stored in the instrument block table 52*c*. Therefore, it is possible to prevent both sound data stored in the instrument block table 52*c* by the previous user and sound data stored in the instrument block table 52*c* by a new user from being used.

Tone data of sound data of a purchase block stored in the sharing block table 45*b* of the recording medium 45 can be stored into the instrument block table 52*c* regardless of matching between user keys unlike when sound data of a purchase block stored in the purchase block table 45*a* is stored into the instrument block table 52*c* (S20: Yes and S21). Thus, it is possible to share the tone data by users and thus to improve convenience.

The tone data is formed of variable values that can be created or edited on the synthesizer 50 by using the operators 57. As described above, since the tone data can be shared by users, for example, each user in a group can perform by using the same tone in the group without creating tone data by using the operators 57.

A purchase block including tone data is output to the recording medium 45 from the synthesizer 50 and is used in the synthesizers 50 or the like of other users. Instead of sound data including purchased wave data being shared by users, the tone data output from the synthesizer 50 is shared by users having similar models, and thus it is possible to reduce the influence on purchase of sound data including wave data and also to improve a user's convenience.

A sharing block includes output tone data of sound data and a user key of a user that has output the tone data. Thus, even if a sharing block including tone data (for example, purchasable tone data) of which sharing is not preferable between users is uploaded onto the Internet 2, a user who has output the sharing block can be tracked on the basis of a user key in the sharing block, and thus it is possible to curb users from uploading such tone data of which sharing is not preferable.

The disclosure has been described on the basis of the embodiment but is not limited to the embodiment, and it can be easily predicted that various modifications and alterations may occur within the scope without departing from the spirit of the disclosure. For example, there is no limitation to a case of using the sound generating device 59 built into the synthesizer 50, and the synthesizer 50 may be connected to an external sound generating device. There is no limitation to a case where the keyboard device 56 is provided in the synthesizer 50, and an externally attached keyboard device may be connected to the synthesizer 50.

In the embodiment, the data using device configured with the synthesizer 50 including the data using program 52a has been described, but this is only an example. The disclosure may be applied to various electronic musical instruments such as electronic keyboard instruments, electronic percussion instruments, and electronic guitars in addition to synthesizers such as electronic pianos and electronic organs, as a data using device that uses sound data in a sound generation process (musical sound generation process), and the disclosure may be applied to an aspect in which a computer is operated as an electronic musical instrument by the data using program 52a. The disclosure is not limited to a case where it is determined whether sound data used for a sound generation process can be stored into an electronic musical instrument, and may be applied to a case where it is determined whether performance data used for an automatic performance process or musical score data used for a musical score display process can be stored into a musical instrument. The disclosure may be applied to a musical score display device, a video player, an electronic book reader, a navigation device, and the like that use musical score data, image data, video data, text data, map data, and the like in predetermined processes.

The synthesizer 50 in the embodiment has been described regarding a case where sound data is stored into the instrument block table 52c from the purchase block of the purchase block table 45a of the recording medium 45 or the sharing block of the sharing block table 45b, but this is only an example. A communication device for connection to the Internet 2 may be provided in the synthesizer 50, and sound data of a purchase block or a sharing block may be stored into the instrument block table 52c from various servers (external apparatuses) on the Internet 2. The external input and output terminals 42 of the PC 30 may be connected to the external input and output terminals 55 of the synthesizer 50 via a cable, and sound data may be stored into the instrument block table 52c from the purchase block of the purchase block table 32a or the sharing block of the sharing block table 32b of the PC 30 (external apparatus).

In the embodiment, a case where sound data of a purchase block or a sharing block is stored into the instrument block table 52c and a user key in the purchase block or the sharing block is not stored into the instrument block table 52c has been described, but this is only an example. The sound data of the purchase block or the sharing block may be stored into the instrument block table 52c in association with the user key. In other words, a purchase block or a sharing block including sound data that can be used for the musical sound generation process may be stored in the instrument block table 52c. Consequently, it is possible to know a user who has output (created) a sharing block on the basis of a user key in the sharing block stored in the instrument block table 52c.

In a case where the sound data is stored in the instrument block table 52c in association with the user key, when tone data of the sound data has been created or edited on the synthesizer 50, the created or edited tone data and the user key stored in the user key memory 52b may be stored into the instrument block table 52c in association with each other. The portion of the user key stored in the instrument block table 52c or the user key in the sharing block may be configured by histories of a user key of a user who has output the tone data and a user key of a user who has created or edited the tone data. Consequently, it is possible to track a path along which a sharing block uploaded on the Internet has been uploaded.

In a case where the sound data is stored in the instrument block table 52c in association with the user key, when a user key in the user key memory 52b is deleted in the process in S4 in FIG. 4, only sound data associated with the deleted user key may be prohibited from being used through deletion or the like, and sound data associated with another user key different from the deleted user key may remain to be available.

In the embodiment, the process in S4 (refer to FIG. 4) in which, in a case where a user key in the user key memory 52b is deleted, sound data is prohibited from being used by deleting the sound data already stored in the instrument block table 52c has been described, but this is only an example. In a case where a user key is deleted in the process in S4, sound data may be prohibited from being used by associating an identifier or the like indicating "unavailable" with sound data already stored in the instrument block table 52c such that the sound data cannot be displayed on the display device 58 or the like and the unavailable sound data cannot be selected to be used for the sound generation process (S5).

In the embodiment, a description has been made of a case where, when the user key in the purchase block acquired through the process in S12 in FIG. 5 does not match the user key stored in the user key memory 52b (S14: No), display for instructing the user to clear the user key memory 52b is performed on the display device 58 (S15), but this is only an example. Voice for instructing the user to clear the user key memory 52b may be output from the speaker 60 or the like instead of performing the display on the display device 58.

Instead of the process in S15 of instructing the user to clear the user key memory 52b (delete the user key) in a case where the user key in the purchase block acquired through the process in S12 in FIG. 5 does not match the user key stored in the user key memory 52b (S14: No), the process in S4 (refer to FIG. 4) in which the user key in the user key memory 52b is deleted and the sound data stored in the instrument block table 52c is deleted to be prohibited from being used may be performed. However, in the embodiment, when the user keys do not match each other in the process in S14, the user is instructed to delete the user key in the user key memory 52b (S15), and the user is entrusted with whether to delete the user key. As a result, the user can select whether to store the sound data purchased by the user into the synthesizer 50 such that the sound data is available, or to leave the sound data that has been available hitherto in the synthesizer 50.

The process in S4 of clearing the user key memory 52b and the instrument block table 52c may be performed in a case where there is an operation of clearing the user key memory 52b at any timing (S3: Yes in FIG. 4) without limitation to the time when the user is instructed to clear the user key memory 52b (S15) due to mismatch between the user keys in the process in S14 in FIG. 5.

In the embodiment, a case where the purchase block table 32a storing a purchase block and the sharing block table 32b storing a sharing block are provided in the HDD 32 has been described, but this is only an example. The purchase block table 32a and the sharing block table 32b may be provided in the HDD 32 as one data table without distinction, and a purchase block and a sharing block may be stored separately in the data table. Similarly, the purchase block table 45a and the sharing block table 45b provided in the recording medium 45 may be combined into one data table.

In the embodiment, a description has been made of the case where the purchase block is acquired from the purchase block table 45a in the process in S12 in FIG. 5, and, when the user key in the purchase block matches the user key in the user key memory 52b (S14: Yes), the sound data of the purchase block acquired in the process in S12 is stored into the instrument block table 52c (S16), but this is only an example. First, only a user key in the purchase block may be acquired from the purchase block table 45a in the process in S12, and, when the user key matches the user key in the user key memory 52b (S14: Yes), a purchase block including sound data (or only the sound data) may be acquired from the purchase block table 45a, and the sound data may be stored into the instrument block table 52c. The sound data of the purchase block may be acquired from the purchase block table 45a, and then the user key in the purchase block may be acquired.

As a purchase block, there is no limitation to a case where sound data and a user key of a user who has purchased the sound data form a block of data. As long as sound data (authentication data) and a user key of a user who has purchased the sound data are associated with each other, the sound data and the user key may be handled separately. As a sharing block, there is no limitation to a case where sound data and a user key of a user who has output the sound data form a block of data. As long as sound data (shared data) and a user key of a user who has purchased the sound data are associated with each other, the sound data and the user key may be handled separately.

In the embodiment, a description has been made of the case where, when the sound data already stored in the instrument block table 52c is deleted in the process in S4 in FIG. 4, both of the wave data and the tone data are deleted, but this is only an example. Only the wave data that cannot be shared by users may be deleted, and the tone data that can be shared by users does not need to be deleted. Consequently, it is possible to reduce the influence on purchase of sound data including wave data and also to improve a user's convenience.

The numerical values given in the embodiment are examples, and other numerical values may be naturally employed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic musical instrument that executes a predetermined process by using data, comprising:
   an instrument block table that stores pieces of data used for the predetermined process;
   a user key memory that stores a first user identification information;
   a processor that acquires, from an external apparatus, authentication data that is data requiring authentication using the first user identification information when using the authentication data for the predetermined process,
   the processor acquires a second user identification information indicating a user who can use the authentication data acquired by the processor from the external apparatus;
   the processor determines whether the second user identification information acquired by the processor matches the first user identification information stored in the user key memory;
   the processor stores the authentication data acquired by the processor into the instrument block table such that the authentication data is available for the predetermined process in a case where the first user identification information is not stored in the user key memory;
   the processor deletes the first user identification information stored in part the user key memory or instructs a user to delete the first user identification information in a case where the processor determines that the first and second user identification information do not match each other; and
   the processor prohibits use of the authentication data stored in the instrument block table in a case where the first user identification information stored in the user key memory is deleted,
   wherein the processor stores the second user identification information acquired by the processor into the user key memory in a case where the authentication data is stored into the instrument block table by the processor in a state in which the first user identification information is not stored in the user key memory,
   the processor acquires shared data that does not require authentication using the first user identification information when using the shared data and is output from the external apparatus among the pieces of data, and acquires the second user identification information of a user who has output the shared data from the external apparatus; and
   the processor stores the shared data into the instrument block table such that the shared data is available for the predetermined process regardless of matching between the first and second user identification information in a case where the shared data is acquired by the processor,
   wherein the data is sound data including tone information formed of variable values and waveform information regarding sound, the tone information and the waveform information are used for the predetermined process, wherein the electronic musical instrument further comprises a keyboard device to which performance information is input by a performer, and an operator that adjusts the variable values in the tone information, wherein the predetermined process is a process of generating a musical sound on the basis of the performance information that is input with the keyboard device and the sound data.

2. The electronic musical instrument according to claim 1, wherein the user key memory stores only one user identification information.

3. The electronic musical instrument according to claim 1, wherein the processor acquires shared data that does not require authentication using the first user identification information when using the shared data and is output from the external apparatus among the pieces of data, and acquires the second user identification information of a user who has output the shared data from the external apparatus; and the processor stores the shared data into the instrument block table such that the shared data is available for the predetermined process regardless of matching between the first and second user identification information in a case where the shared data is acquired by the processor.

4. The electronic musical instrument according to claim 2, wherein the processor acquires shared data that does not require authentication using the first user identification information when using the shared data and is output from the external apparatus among the pieces of data, and acquires the second user identification information of a user who has output the shared data from the external apparatus; and the processor stores the shared data into the instrument block table such that the shared data is available for the predetermined process regardless of matching between the first and second user identification information in a case where the shared data is acquired by the processor.

5. The electronic musical instrument according to claim 3, wherein, in a case where the first user identification information stored in the user key memory is deleted, the processor prohibits use of both of the authentication data and the shared data.

6. The electronic musical instrument according to claim 3, wherein the processor outputs the data stored in the instrument block table to the external apparatus as the shared data in a state in which the data is associated with the first user identification information stored in the user key memory.

7. The electronic musical instrument according to claim 5, wherein the processor outputs the data stored in the instrument block table to the external apparatus as the shared data in a state in which the data is associated with the first user identification information stored in the user key memory.

8. The electronic musical instrument according to claim 1, wherein the processor outputs the tone information excluding the waveform information from the data stored in the instrument block table to the external apparatus as the shared data in a state in which the tone information is associated with the first user identification information stored in the user key memory.

9. An electronic musical instrument that executes a predetermined process by using sound data, comprising:

instrument block table configured to store the sound data including tone information formed of variable values and wave information regarding sound;

a user key memory configured to store a first user identification information;

a keyboard device to which performance information is input by a performer;

an operator configured to adjust the variable values in the tone information; and a processor configured to perform the predetermined process comprising:

generating a musical sound on a basis of the performance information that is input with the keyboard device and the sound data;

acquiring the sound data from an external apparatus, wherein the sound data is authentication data that is data requiring authentication using the first user identification information or shared data that does not require authentication using the first user identification information in a case when the sound data is applied to generate the musical sound;

acquiring second user identification information from the external apparatus, wherein the second user identification information is in correlation with the sound data acquired by the external apparatus;

determining whether the acquired second user identification information matches the first user identification information stored in the user key memory;

in a case when the authentication data is acquired, storing the authentication data into the instrument block table if the first user identification information matches the second user identification information or if the first user identification information is not stored in the user key memory, and storing the second user identification information into the user key memory if the first user identification information is not stored in the user key memory;

in a case when the shared data is acquired, storing the shared data into the instrument block table regardless of matching between the first user identification information and the second user identification information.

10. The electronic musical instrument according to claim 9, wherein the user key memory stores only one user identification information.

11. The electronic musical instrument according to claim 9, wherein the processor deletes the first user identification information stored in the user key memory or instructs a user to delete the first user identification information in a case where the processor determines that the first and second user identification information do not match each other; and the processor prohibits use of the authentication data stored in the instrument block table in a case where the first user identification information stored in the user key memory is deleted.

12. The electronic musical instrument according to claim 11, wherein the predetermined process further comprises:

outputting the sound data excluding the waveform information stored in the instrument block table to the external apparatus as the shared data in a state in which the tone information is associated with the first user identification information stored in the user key memory.

13. The electronic musical instrument according to claim 9, wherein the predetermined process further comprises:
outputting the sound data excluding the waveform information stored in the instrument block table to the external apparatus as the shared data in a state in which the tone information is associated with the first user identification information stored in the user key memory.

14. A data using method of executing a predetermined process by using data for an electronic musical instrument, the method comprising:
storing pieces of data used for the predetermined process in an instrument block;
storing a first user identification information in a user key memory;
acquiring, from an external apparatus, authentication data that is data requiring authentication using the first user identification information when using the authentication data for the predetermined process;
acquiring a second user identification information indicating a user who can use the authentication data acquired from the external apparatus;
determining whether the second user identification information matches the first user identification information stored in the user key memory;
storing the authentication data into the instrument block table such that the authentication data is available for the predetermined process in a case where the first user identification information is not stored in the user key memory;
deleting the first user identification information stored in the user key memory or instructing a user to delete the first user identification information in a case when determines that the first and second user identification information do not match each other;
prohibiting use of the authentication data stored in the instrument block table in a case where the first user identification information stored in the user key memory is deleted;
storing the second user identification information into the user key memory in a case where the authentication data is stored into the instrument block table in a state in which the first user identification information is not stored in the user key memory,
acquiring shared data that does not require authentication using the first user identification information when using the shared data and is output from the external apparatus among the pieces of data, and acquires the second user identification information of a user who has output the shared data from the external apparatus;
storing the shared data into the instrument block table such that the shared data is available for the predetermined process regardless of matching between the first and second user identification information in a case where the shared data is acquired,
wherein the data is sound data including tone information formed of variable values used for the predetermined process and waveform information regarding sound,
wherein the electronic musical instrument further comprises
a keyboard device to which performance information is input by a performer, and
an operator that adjusts the variable values in the tone info illation,
wherein the predetermined process is a process of generating a musical sound on the basis of the performance information that is input with the keyboard device and the sound data.

15. The method according to claim 14, further comprising:
outputting the tone information excluding the waveform information from the data stored in the instrument block table to the external apparatus as the shared data in a state in which the tone information is associated with the first user identification information stored in the user key memory.

* * * * *